(12) United States Patent
Zhang et al.

(10) Patent No.: US 9,185,009 B2
(45) Date of Patent: Nov. 10, 2015

(54) STATUS AWARE MEDIA PLAY

(75) Inventors: Kun Zhang, Union City, CA (US);
Kevin Dongsoo Chang, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/528,713

(22) Filed: Jun. 20, 2012

(65) Prior Publication Data

US 2013/0346588 A1  Dec. 26, 2013

(51) Int. Cl.
| | |
|---|---|
| G06F 15/173 | (2006.01) |
| H04L 12/26 | (2006.01) |
| H04L 29/08 | (2006.01) |
| G06Q 30/02 | (2012.01) |
| G06Q 30/06 | (2012.01) |
| H04L 29/06 | (2006.01) |

(52) U.S. Cl.
CPC ............ *H04L 43/08* (2013.01); *G06Q 30/0255* (2013.01); *G06Q 30/0631* (2013.01); *H04L 65/80* (2013.01); *H04L 67/22* (2013.01); *H04L 65/4092* (2013.01); *H04L 67/306* (2013.01)

(58) Field of Classification Search
USPC ................. 709/201–203, 217–219, 223–226, 709/230–235
See application file for complete search history.

(56) References Cited

U.S. PATENT DOCUMENTS

| | | | | |
|---|---|---|---|---|
| 7,640,353 B2 * | 12/2009 | Shen et al. | ..................... | 709/231 |
| 8,176,509 B2 * | 5/2012 | Folgner et al. | .................. | 725/22 |
| 8,185,477 B2 * | 5/2012 | Dasher et al. | ................... | 705/59 |
| 8,239,546 B1 * | 8/2012 | McGowan | ..................... | 709/227 |
| 8,363,716 B2 * | 1/2013 | Kalva et al. | .............. | 375/240.01 |
| 8,687,946 B2 * | 4/2014 | Sathish et al. | ................. | 386/278 |
| 8,843,951 B1 * | 9/2014 | Sherrets et al. | .................. | 725/14 |
| 2004/0170379 A1 * | 9/2004 | Yao et al. | ......................... | 386/46 |
| 2007/0263983 A1 * | 11/2007 | Ando et al. | ...................... | 386/95 |
| 2008/0046937 A1 * | 2/2008 | Smith et al. | ..................... | 725/89 |
| 2008/0313570 A1 * | 12/2008 | Shamma et al. | .............. | 715/846 |
| 2010/0111488 A1 * | 5/2010 | Chia-Chen | ....................... | 386/46 |
| 2011/0013883 A1 * | 1/2011 | Ando et al. | ..................... | 386/248 |
| 2012/0117167 A1 * | 5/2012 | Sadja et al. | .................... | 709/206 |
| 2012/0179693 A1 * | 7/2012 | Knight et al. | ................. | 707/748 |
| 2012/0197792 A1 * | 8/2012 | Raleigh | ............................ | 705/40 |
| 2012/0209841 A1 * | 8/2012 | Saretto et al. | ................. | 707/736 |
| 2012/0210250 A1 * | 8/2012 | Svendsen et al. | ............. | 715/753 |
| 2012/0237181 A1 * | 9/2012 | Ando et al. | .................... | 386/240 |
| 2012/0278331 A1 * | 11/2012 | Campbell et al. | ............. | 707/740 |
| 2012/0323938 A1 * | 12/2012 | Skeen et al. | .................... | 707/754 |
| 2013/0046773 A1 * | 2/2013 | Kannan et al. | ................. | 707/754 |
| 2013/0051772 A1 * | 2/2013 | Ramaswamy et al. | ......... | 386/291 |
| 2013/0268620 A1 * | 10/2013 | Osminer | ........................ | 709/217 |

OTHER PUBLICATIONS

International Search Report for International (PCT) Patent Application No. PCT/US2013/046908, Nov. 26, 2013 (7 pages).
Written Opinion for International (PCT) Patent Application No. PCT/US2013/046908, Nov. 26, 2013 (6 pages).

* cited by examiner

*Primary Examiner* — Joseph E Avellino
*Assistant Examiner* — Phyllis A Book
(74) *Attorney, Agent, or Firm* — Lowenstein Sandler LLP (57) ABSTRACT

Techniques for determining status aware media play are described. When current user behavior with respect to a media segment deviates from baseline user behavior, the media segment is tagged in memory, and a determination is made as to whether playback functionality with respect to the tagged media segment should be adjusted.

16 Claims, 5 Drawing Sheets

101

| Video Sharing | _ ☐ ☒ |

File  Edit  View  History  Bookmarks  Tools  Help

⇦ ⇨ ⊙ ⓧ  ⌂  ☐ http://www.videosharing.com | 🔍  ☐ Search | 🔍

Video  Sign Up | My Account | History | Help | Log in | Site ○
Share Yourself  [Videos] [Categories] [Channels] [Community]  ⓐ Upload

[ducati] [Search] [Search]

Search results for "ducati"  —103  1-20 of about 6,000

Sort by: Relevance | Date Added | View Count | Rating   Display: ▦ ▦

---

★★★★☆

La storia della Ducati Superbike
From early Pantah F1 to 1068, 25
years of Ducati superbike. Forza
Daemo, Forza Ducati...Ducati
Superbike 999 888 915 748 995 998
F1 Desmoquatiro
Tags: Ducati Superbike 999 888 915
748 995 998 F1 Desmoquatiro Deemo
Time: 02:38

From: ElGladiatour
Views: 81,263
Added: 11 Months ago
More: Autos & Vehicle

105

---

★★★★☆

Lamborghini Gallardo vs. Ducati 999

Fith Geer clip featuring Lamborghini
Gallardo vs. Ducati 999 .. Racing
supercar superbike Fifth Gear
Tags: racing supercar superbike fifth
    gear
Time: 03:03

From: Jay302
Views: 285,614
Added: 1 year ago
More: Howto & Style

107

---

★★★★☆

Mazda RX7 Tuned Vs Ducati 748
MAZDA ITS GANSTA .... Mazda RX7
Tags: Mazda Rx7
Time: 03:33

From: MRGEYEZ
Views: 215,493
Added: 1 year ago
More: Sports

---

★★★★☆

Ducati 848 Elcma 2007
Ducati 848 Elerra 2007 by Motoblogit ..

From: blogvideo

Done

STATUS AWARE MEDIA PLAY

BACKGROUND

Video hosting refers to software where users distribute video clips, typically found on the Internet. Video-hosting websites allow users to discover videos available over the Internet. A user discovers videos of interest by submitting a search query to the video-hosting website or browsing in different categories or channels of the video-searching website. Using either approach, the video host presents the user with a list of videos from which he or she can choose.

Once a user finds a video of interest and selects a link to the video, the user loads a webpage associated with the video and views the video and/or details of the video. The video-hosting website allows a user to search and view videos contained within the video-hosting website, or videos located on or sourced from other websites.

SUMMARY

Described herein are techniques for determining status aware media play. A database stores content. A user-interaction analyzer is in communication with the database. The user-interaction analyzer monitors user behavior with respect to media interaction on a device. User behavior is logged into memory. Normal user behavior is determined. The normal user behavior is stored in memory. User behavior is compared with normal user behavior. When user behavior is not normal, the media segment is tagged in memory. User behavior related to tagged media segment is paired and stored in memory. The paired user behavior related to tagged media segment is analyzed to adjust playback functionality. A playback adjust requestor is configured such that, when the user interaction analyzer designates a tagged media segment for low-bandwidth stream, the playback adjust requestor requests a low-bandwidth stream.

This Summary introduces concepts in a simplified form that are further described below in the Detailed Description. This Summary is not intended to identify key features or essential features of the claimed subject matter, nor is it intended to be used as an aid in determining the scope of the claimed subject matter. The term 'techniques', for instance, refers to device(s), system(s), method(s) and/or computer-readable instructions as permitted by the context above and throughout the document.

BRIEF DESCRIPTION OF THE FIGURES

The detailed description refers to the following accompanying drawings.

DETAILED DESCRIPTION

Overview

Video-hosting services as well as other content providers utilize a great deal of video bandwidth. Often this bandwidth is wasted, for example if the user has stopped looking at the content or is listening only to the audio portion, has reduced the video portion to an icon, and whose attention is elsewhere, such as typing in a document.

Figure 1:
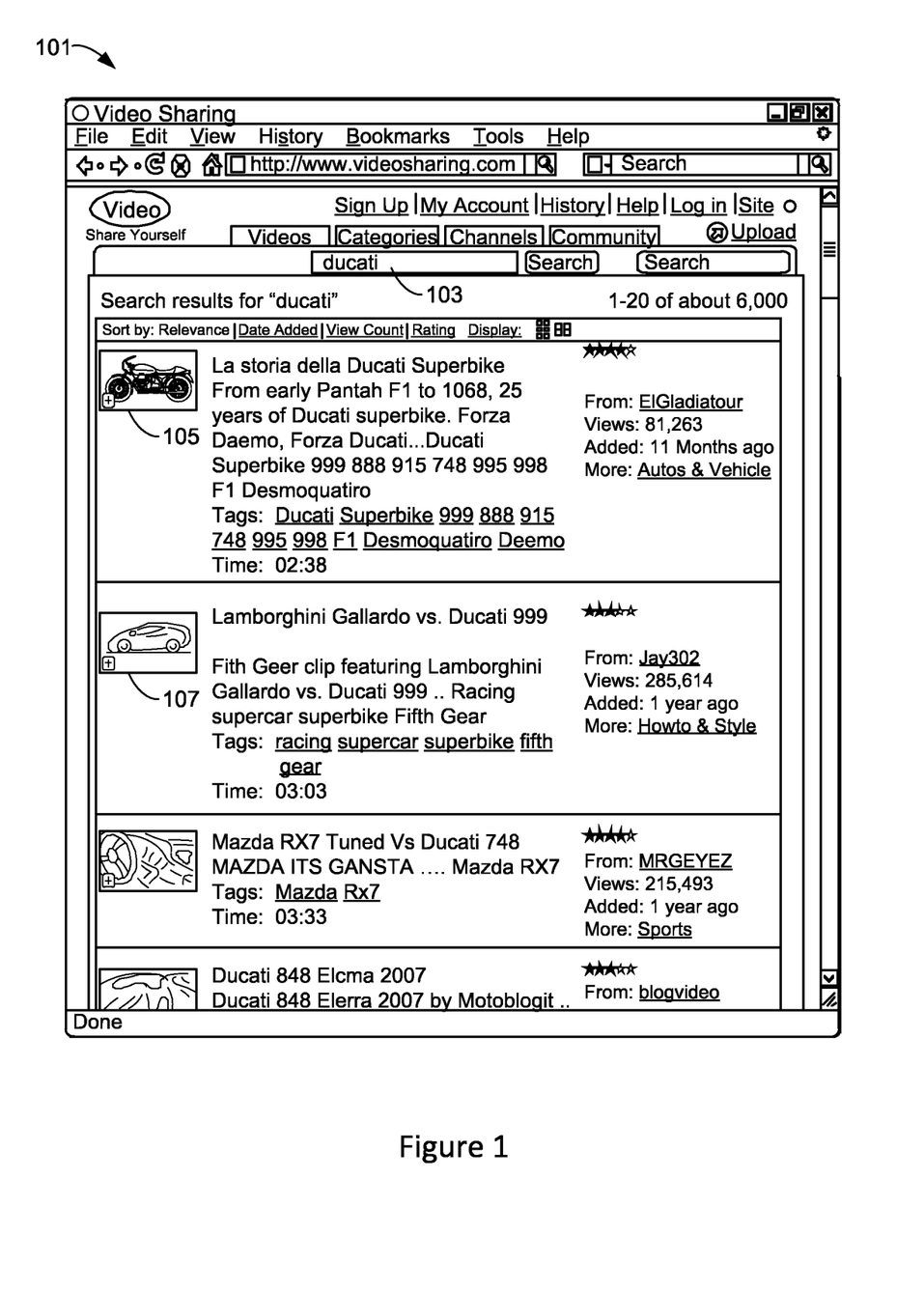
FIG. 1 displays a screen shot illustrating an example of a user interface displaying videos associated with a user search query.

By way of example, FIG. 1 displays an example user interface 101 illustrating a result page responsive to a user querying the keyword "Ducati" into the dialog box 103, for videos related to products sold by Ducati Motor Holding S.P.A., 3 Via Cavalieri Ducati, Bologna, Italy 40132. Ducati is a registered trademark of Ducati Motor Holding S.P.A. For the keyword, the user interface 101 lists appropriate videos retrieved from a video repository. Examples of appropriate videos include "La storia della Ducati Superbike" 105 and "Lamborghini Gallardo vs. Ducati 999" 107. Lamborghini is a registered trademark of Automobili Lamborghini Holding S.p.A., Via Modena, 12 Sant'Agata Bolognese Italy 40019 After reviewing the result page, the user selects a target video from the result page to watch.

After selection of the target video, a front-end interface transmits and presents the requested video and related-video links to the user. In addition, icon or thumbnail views of related videos accompany the links, along with associated metadata such as, for example, title, author, tags, and rating. For example, if a user provides the front-end interface with a request for a specific video with the title of "La storia della Ducati Superbike", a front-end interface presents the selected target video to the user along with links to related videos.

Figure 2:
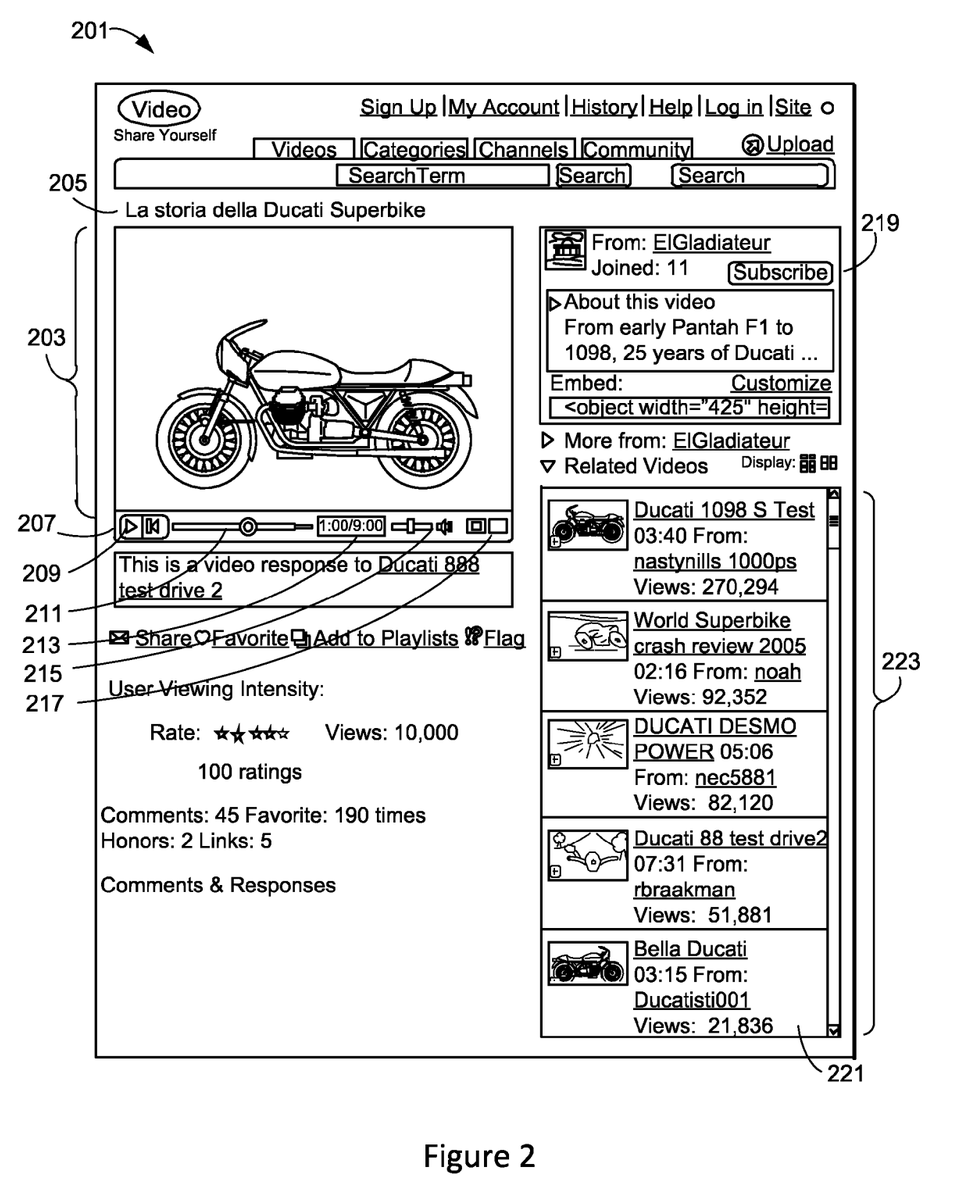
FIG. 2 displays a screen shot illustrating an example of a user interface displaying the target video and its related videos.

FIG. 2 displays an example webpage 201 playing the video 203 with the title of "La storia della Ducati Superbike" 205. The webpage 201 contains controls 207 that allow a user to control how and when to play the video 201. Such controls 207 can include, for example, a play/pause button 209, a progress bar 211 that allows a user to skip ahead or repeat, a timer 213, a volume control 215, and a screen size adjustment 217. A video-information box 219 contains information about the video. A related-videos box 221 contains links to videos 223 that a video-hosting service has determined to display as related to video 203. The video-serving module retrieves the related videos from a video repository for user presentation. If a user selects a link of a related video, the video-hosting service plays the related video.

Described herein are techniques for determining status aware media play. A database stores content. A user-interaction analyzer is in communication with the database. The user-interaction analyzer monitors user behavior with respect to media interaction on a device. Users may opt out of having their information collected. If a user does not opt out, the user behavior is logged into memory.

A baseline of what constitutes normal user behavior is determined. The normal user behavior is stored in memory. Actual user behavior is compared with normal user behavior. When user behavior is not normal, the media segment is tagged in memory. User behavior related to tagged media segment is paired and stored in memory. The paired user behavior related to tagged media segment is analyzed to adjust playback functionality.

A playback adjust requestor is configured such that, when the user interaction analyzer designates a tagged media segment for a low-bandwidth stream, the playback adjust requestor requests a low-bandwidth stream.

This brief overview, as well as section titles and corresponding summaries, are provided for the reader's convenience and are not intended to limit the scope of the claims or the proceeding sections.

The Internet

As mentioned previously, video hosting is typically found on the Internet. The Internet connects a global network of computers. Network servers support hypertext capabilities that permit the Internet to link together websites. Hypertext is text displayed on a computer or other electronic devices with references (for example, hyperlinks) to other text. Users navigate the Internet through graphical-user interfaces (GUI). Uniform-resource locators (URLs) identify specific websites and web pages. URLs also identify the address of the website to be retrieved from a network server. The transfer control protocol/internet protocol (TCP/IP) transfers information.

The Internet typically uses a hypertext language referred to as the hypertext mark-up language (HTML). HTML permits content providers to place hyperlinks within web pages. These hyperlinks connect related content or data, which may be found on multiple Internet-host computers. HTML document links retrieve remote data by use of hypertext transfer protocol (HTTP). When a user clicks on a link in a web document, the link icon in the document contains the URL that the client application employs to initiate the session with the server storing the linked document. HTTP is a protocol used to support the information transfer.

System Architecture

Figure 3:
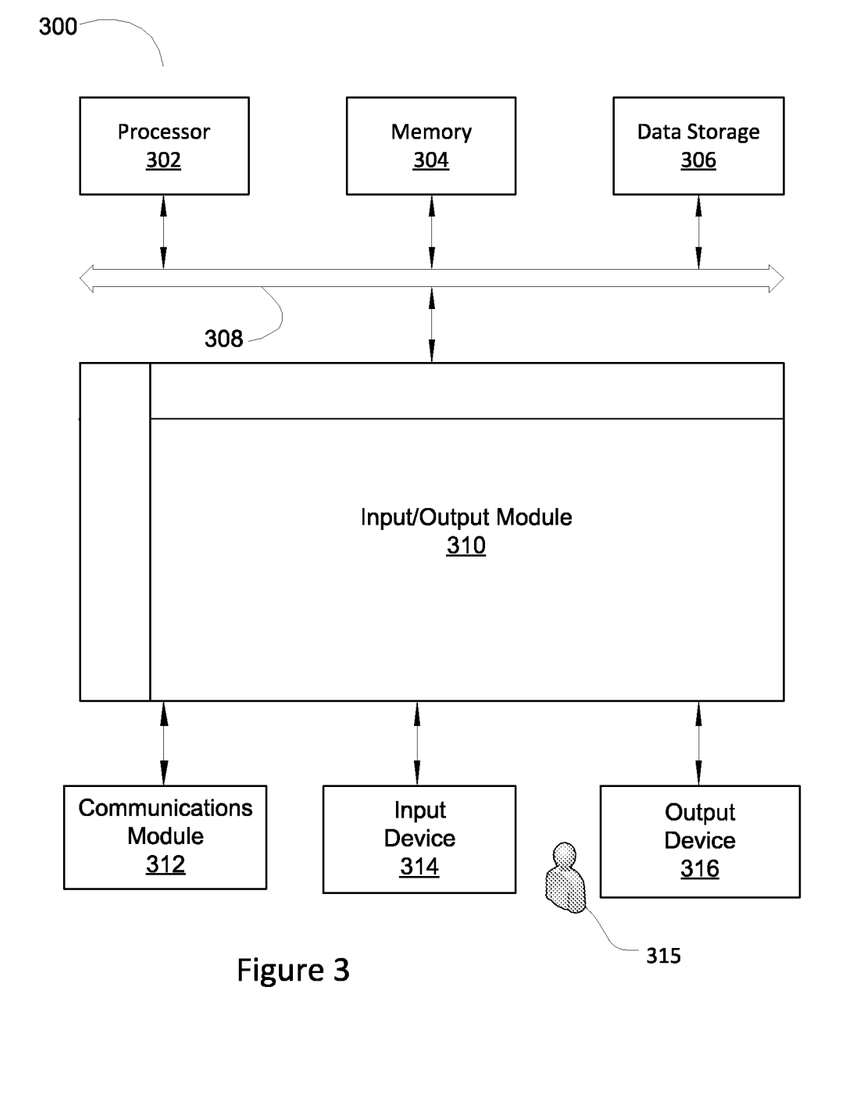
FIG. 3 displays a high-level block diagram of example computer architecture in which techniques for determining status aware media play can be employed.

FIG. 3 displays a high-level block diagram of example computer architecture in which techniques for determining user behavior related to videos described herein can be employed. The computer system 300 can include, in addition to hardware, computer-executable instructions stored in memory 304. A bus couples the memory 304 for storing information and instructions executable by processor 302. Special purpose logic circuitry can supplement or incorporate the processor 302 and the memory 304.

The instructions may be stored in the memory 304 and implemented in one or more computer program products. Computer program products can be one or more modules of computer program instructions encoded on a computer readable medium for execution by, or to control the operation of, the computer system 300. Memory 304 may store temporary variable or other intermediate information during execution of instructions executable by the processor 302.

The computer system 300 further includes a data storage device 306 coupled to bus 308. The data storage device 306 stores information and instructions. An input/output module 310 may couple computer system 300 to various devices. The input/output module 310 can be any input/output module. Examples of input/output modules 310 include data ports such as universal serial bus (USB) ports. The input/output module 310 connects to a communications module 312. Examples of communications modules 312 include networking interface cards, such as Ethernet cards and modems.

The input/output module 310 connects to a number of devices, such as an input device 314 and/or an output device 316. Examples of input devices 314 include a keyboard and a pointing device such as, for example, a mouse, by which a user 315 can provide input to the computer system 300. Examples of output devices 316 include display devices such as, for example, a liquid crystal display (LCD) monitor for displaying information to the user 315.

According to one aspect, the techniques can be implemented using a computer system 300 in response to processor 302 executing one or more sequences of one or more instructions contained in memory 304. Another machine-readable medium, such as data storage device 306, may read such instructions into memory 304. Execution of the sequences of instructions contained in memory 304 causes processor 302 to perform the process steps described herein.

Computing system 300 can include clients and servers. A client and server are generally remote from each other and typically interact through a communication network. The relationship of client and server arises by virtue of computer programs running on the respective computers and having a client-server relationship to each other.

Figure 4:
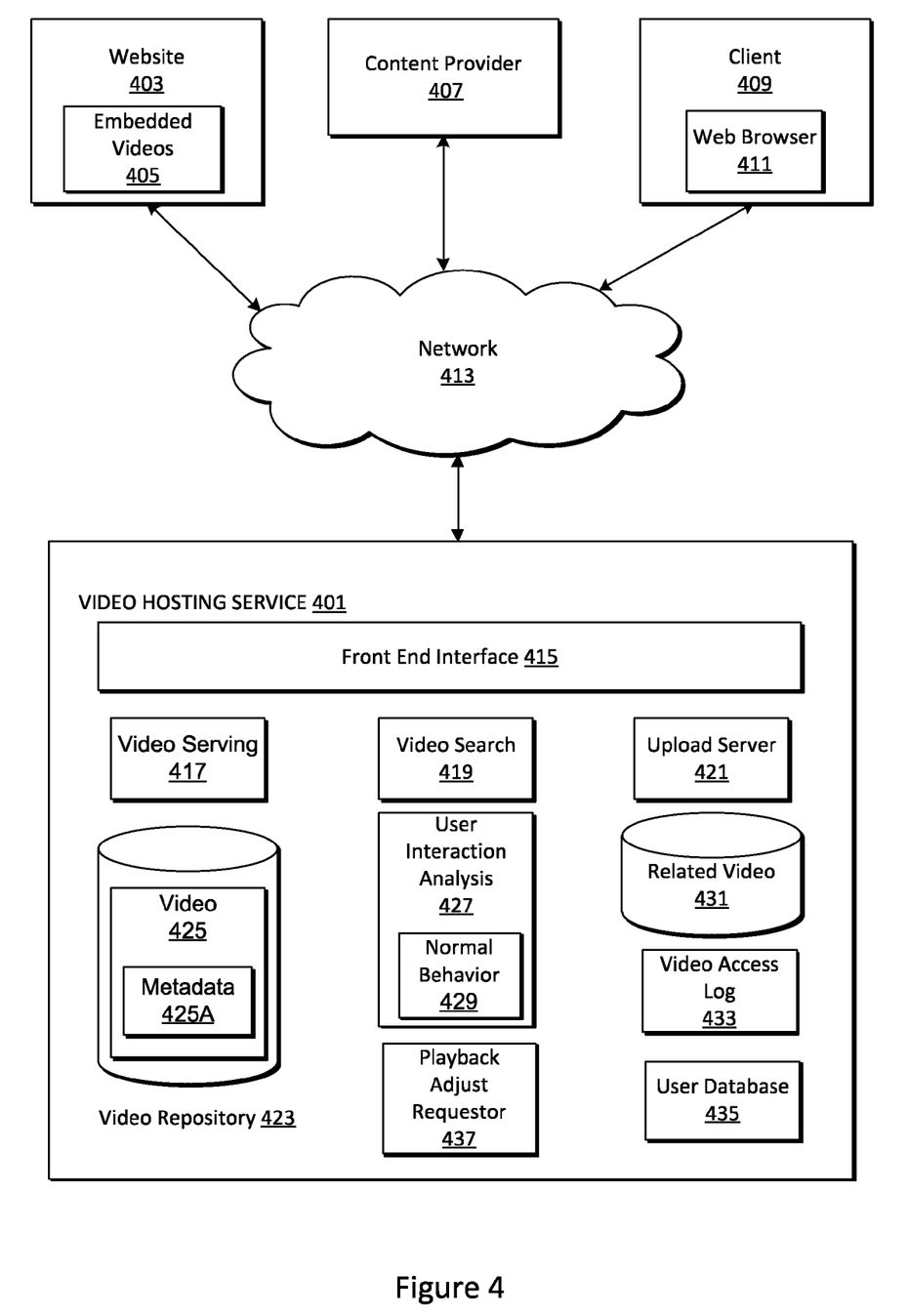
FIG. 4 displays a high-level block diagram of an example media-hosting service system architecture in which techniques for determining status aware media play can be employed.

FIG. 4 shows a high-level block diagram of an example video-hosting service 401 that determines user behavior related to videos. Generally, the video-hosting service 401 represents any system that allows users to access video content via searching and/or browsing interfaces. In one implementation, the video-hosting service 401 makes available additional types of media. In addition to video, examples of media include audio files such as music, podcasts, audio books, and the like; multimedia presentations; and so forth.

The video-hosting service 401 represents a system that stores and provides videos to users. The video-hosting service 401 communicates with a number of content providers 407 and clients 409 via a network 413, such as the Internet. The configuration and management of large networks includes storage devices and computers that are communicatively coupled to dissimilar computers and storage devices. The network 413 is typically the Internet, but may be any network.

A client 409 is a computing device that executes client software such as, for example, a web browser 411 to load a website. The client 409 connects to the video-hosting service 401 via the network 413 to display videos. The client 409 can include a variety of different computing devices. Examples of computing devices include digital assistants, personal digital assistants, cellular phones, mobile phones, smart phones, laptop computers, tablet computers, and the like.

In some implementations, the client 409 includes an embedded-video player such as, for example, the FLASH® video player available from Adobe Systems Incorporated, 345 Park Avenue, San Jose, Calif. 95110. Of course, the client 409 can include other players adapted for the video file formats used in the video-hosting service 401.

The videos are sourced from user uploads, searches or crawls of other websites or databases of videos, and combinations thereof. The video-hosting service 401 obtains data from various external websites 403. The websites 403 include one or more web pages accessible to the video-hosting service 401 via the network 413. The web pages include, for example, textual content such as HTML.

The user of the content provider 407 performs various content-provider functions. Examples of content provider functions include uploading a video to the video-hosting service 401, editing a video stored by the video-hosting service 401, editing metadata information about a video, editing content-provider preferences associated with a video, and the like. For the sake of clarity, FIG. 4 depicts only one instance of website 403 and content provider 407, though there could be any number of each. In addition, while only one client 409 is shown, the video-hosting service 401 supports and communicates with very large numbers (such as millions) of clients at any time.

The video-hosting service 401 includes a front-end interface 415, a video-serving module 417, a video-search module 419, an upload server 421, a video repository 423, a user-interaction-analysis module 427 including a normal video sub-module 429, a related-videos database 431, a video-access log 433, a user database 435, and a playback adjust requestor 437. Other conventional features such as, for example, firewalls, load balancers, authentication servers, application servers, failover servers, site-management tools, and so forth are not shown so as to illustrate more clearly the features of the system.

The front-end interface 415 interfaces between the client 409 and the various components of the video-hosting service 401. The upload server 421 receives video content from a content provider 407. The video repository 423 contains a set of videos 425 submitted by content providers 407. The video repository 423 contains any number of videos 425 such as, for example, tens of thousands or hundreds of millions. The video repository 423 can be implemented using a database or file system, with indexing system for indexing and retrieving videos. A unique video identifier distinguishes each video from other videos, such as a textual name (for example, the string "a91qrx8"), an integer or any other way of uniquely naming a video.

In addition to audiovisual content, the videos 425 include associated metadata 425A. Examples of metadata include textual metadata such as a title, description, and/or tags provided by a content provider 407 who uploaded the video or metadata obtained by an analysis of a video done by the video-hosting service 401.

Using the video-search module 419, clients 409 search for videos from the video-hosting service 401 using keywords, browse various categories or channels, review play lists from other users or the system administrator (such as collections of videos forming channels), view videos associated with particular user groups (such as communities), and the like. The video-search module 419 locates appropriate videos in the video repository 423 to return to the client 409. The video-serving module 417 provides video data from the video repository 423 to the client 409. The user interaction-analysis module 427 determines related videos for a given video.

Various containers or wrappers package the videos 425. A container is a meta-file format whose specification describes how different data elements and metadata coexist in a computer file. Examples of meta-file format include audio video interleave or interleaved (AVI) multimedia container standard specified available from Microsoft Corporation, One Microsoft Way, Redmond, Wash. 98052; MP4 multimedia-container standard based on the International Organization for Standardization (ISO) base-media-file format defined in MPEG-4 Part 12 and JPEG-2000 Part 12; QuickTime file format (QTFF) (.mov) developed by Apple Inc., 1 Infinite Loop, Cupertino, Calif. 95014; and the like.

Video codecs encode the videos 425. A video codec enables video compression and/or decompression for digital video. An example of a video codec includes advanced video coding (AVC) standard H.264/MPEG-4, Part 10 developed by the International Telecommunication Union (ITU) T Video Coding Experts Group (VCEG) together with the (ISO)/International Electrotechnical Commission (IEC) Moving Picture Experts Group.

User Behavior

As previously introduced, techniques for determining status aware media play are described herein. For websites that have media play functions, client software is added in the media player, webpage or as native application on the client device. Server software is added to monitor status of media player, web page, browser, and even machine status. User status can be monitored and determined or inferred or both, and smart decision can be made on play parameters.

Often users open a playlist, put on their headphones, minimized the window, and get on busy with other things. The techniques described herein monitor the status of the current video play window (for example, visible, size, location). User behavior is monitored with respect to media interaction with the content stored on the database. For example, whether there are activities in video play window (for example, keyboard, mouse, touches) is determined. If the user is using native application on the machine, the techniques can record applications such as, for example, status of keyboard, mouse, browser windows, phone jack, screen use, and the like as a time sequence. Users may opt out of having their information collected. If a user does not opt out, the user behavior with respect to media interaction is logged in memory.

Normal user behavior with respect to media interaction is determined. Normal user behavior can be determined, for example, by interleaving how users: search for content (by typing query and moving mouse over the screen); sample the content (clicking the content to start playing, and trying to evaluate the content by either watching for a short while, or clicking on different portion of the video (known as 'seeking')); consume the content (user starts to engage in the content and may stop keyboard/mouse activities). In addition, normal user behavior can be interleaved by browser window size/player size. For example, if a user seems to be watching the content but with the browser minimized, then that user is probably not consuming the video portion of content; if window is inactive and overlapped by other windows, then the user is probably not consuming the video portion. The normal user behavior is stored in memory as a baseline against which to compare actual user behavior.

User behavior with respect to interaction with a segment of the media is compared with the baseline normal user behavior with respect to media interaction. When user behavior with respect to interaction with a segment of the media is not normal, tag the media segment in memory. For example, when user behavior with respect to interaction with a segment of the media is more than one standard deviation from the baseline normal user behavior, the media segment is tagged.

User behavior related to tagged media segment is paired and stored in memory. Different content may lead to different user behavior—for example, there is more likely to be long periods of inactivity for long video content (movie) then a video of 20 seconds. Interviews, news, talk shows, and the like tend to have more seeking activities than normal videos. If there are less seeking than normal, then inactivity can be detected in this manner. Also, inactivity on (USER, CONTENT) can also be paired. For example, a user repetitively becomes inactive when consuming content V1, but not when consuming content V2: it can be predicted this user is not interested in the visual part of V1.

Paired user behavior related to tagged media segment is analyzed with respect to possibly adjusting playback functionality. When a media segment is tagged for low-bandwidth stream, play parameters can be adjusted accordingly. Examples of play parameters include the bitrate/quality of video or audio, the size of player, the presentation of the player (for example, hidden, opaqueness, color), and the like. For example, a visual cue of darkening/lightening up will smooth the change to maintain a good user experience.

For example, the window is minimized for long period, video bitrate can be reduced to a minimum, the size of the player reduced, the player window can be darkened, and the audio kept playing. A signal is sent to the server of the user status, and the server can skip unnecessary requests (for example, stop serving ads and related videos) until next status change.

When the user returns to the player window, the player window can gradually lighten up, the original video player size restores, and the original video play bitrate restores. An update signal can be sent to the server of the user status, and the server can respond accordingly (for example, begin serving ads and related videos) until next status change.

The server collects information about the user and media, and user status changes. This information can be used to predict a most likely next status for the user, based on the current status and media being played. The server can treat active/passive users differently during analysis of user behavior. User behavior can be cross-pollinated with other user specific information. Play functionality can be adjusted accordingly.

For example, if the server detects that user A usually keeps the window minimized until the play is finished, the server can safely wait until near the end of play to make play parameter change; if the server detects user B usually leaves one minute after playing starts and comes back after five minutes, the server can handle this accordingly. The information between the user and the media (user, media) can be paired, stored, and analyzed to get finer grain of statistics.

Figure 5:
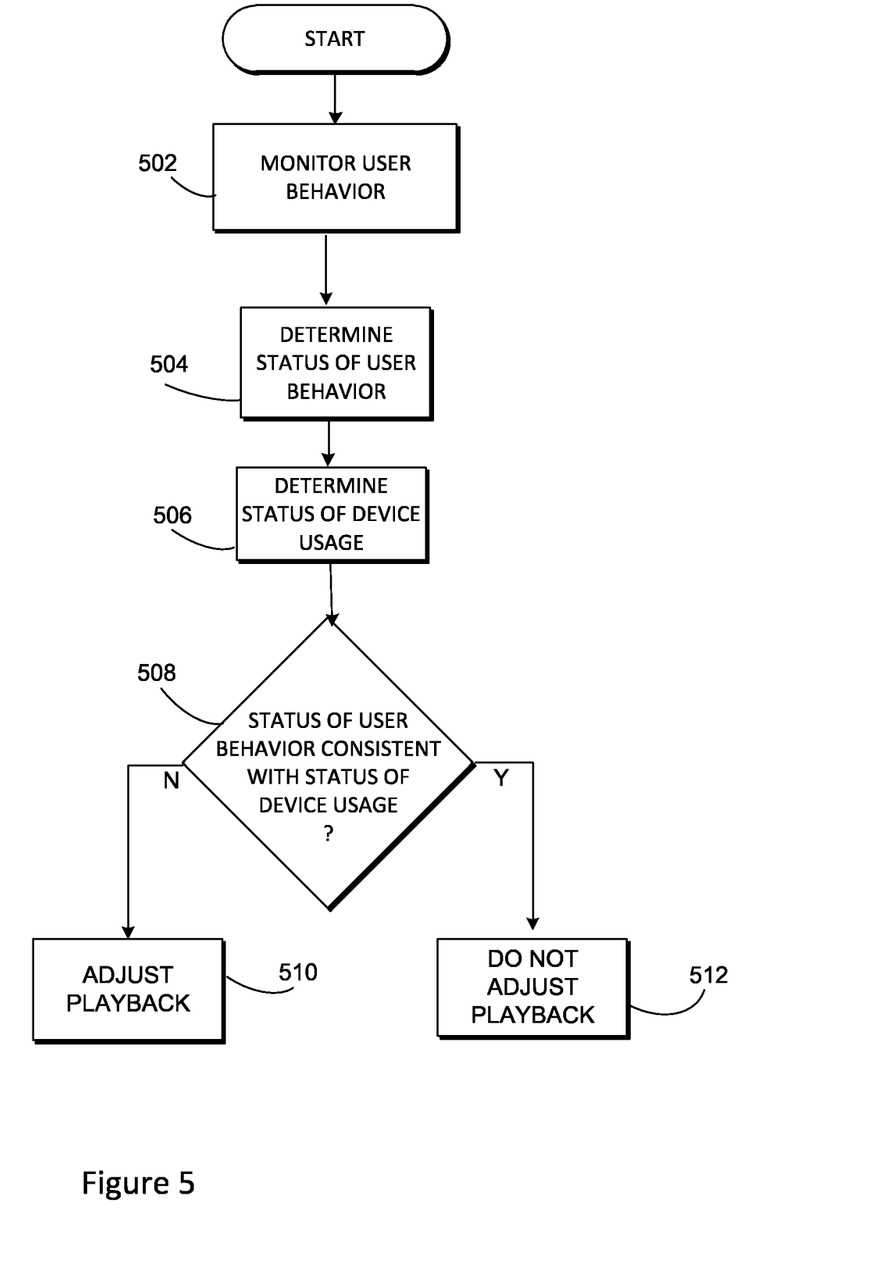
FIG. 5 displays a flow chart of an example process for determining status aware media play.

FIG. 5 is a flow chart illustrating operations of the video-hosting service 201 in determining status aware internet media play according to one implementation. Other implementations perform the steps of FIG. 5 in different orders. In addition, other implementations include different and/or additional steps than the steps described herein. In one implementation, the steps of FIG. 5 are performed by one more executable programs that are part of the video-hosting service 201 in response to the video being uploaded to the video-hosting service 201 for storage. In another implementation, the steps of FIG. 5 are performed by the video-hosting service 201 in response to a user request to view the specific video stored on video-hosting service 201.

User behavior is monitored (502). User behavior with respect to media interaction is monitored (502). A status of user behavior with respect to media interaction is determined (504). A status of device usage with respect to the user is determined (506). The status of user behavior is compared with status of device usage with respect to the user (508). If the status of user behavior is not consistent with the status of device usage with respect to the media, then play functionality is adjusted (510); if the status of user behavior is consistent with the status of device usage with respect to the media, then play functionality is not adjusted (512).

Thus, by utilizing the described techniques for determining status aware media play, play functionality can be adjusted to reduce the use of bandwidth over networks such as the Internet.

Concluding Notes

For the purposes of convenience, the uploaded media is sometimes described in a 'video' or 'videos' implementation; however, limitations on the types of uploaded media are not intended. Thus, the operations described for determining status aware media play apply to any type of media, not only videos. Examples of media include audio files such as music, podcasts, audio books, and the like; multimedia presentations; and so forth.

The implementation described herein is not inherently related to any particular hardware or other apparatus. The operations of the video-hosing service can be controlled through either hardware or through computer programs installed in computer storage and executed by the processors of servers. One or more processors in a multi-processing arrangement also may be employed to execute the sequences of instructions.

When embodied as hardware, the hardware may be specially constructed for the required purposes or the hardware may include a general-purpose computer selectively activated or reconfigured by a computer program stored on a computer-readable medium. In addition, the implementation described herein is not limited to any particular programming language.

The techniques may be implemented using a single computer or a network of computers, including cloud-based computing. The computers can be server-class computers including one or more high-performance central processing units (CPUs), memory such as, for example, one gigabyte (1 GB) or more of main memory, as well as 500 GB to two terabyte (2 TB) of computer-readable persistent storage, network interface, peripheral interfaces, and other well-known components.

The computers can run an operating system. Examples of operating systems include the LINUX® computer-operating system or variants thereof and the like. LINUX® computer-operating system is an open-source operating system that is available under a general-public license administered by The Linux Foundation, 1796 18th Street, Suite C, San Francisco, Calif. 94107. Of course, other types of operating system and computers can be used, and it is expected that more powerful computers developed in the future can be configured in accordance with the teachings herein.

In addition to the Internet, the network may be any network. Examples of networks include local area networks (LAN), metropolitan area networks (MAN), campus area networks (CAN), wide area networks (WAN), mobile wired or wireless networks, private networks, virtual private networks, and the like. In addition, all or some of links can be encrypted using conventional encryption technologies. Examples of encryption technologies include the secure-sockets layer (SSL), secure http, virtual private networks (VPNS), and the like. Other implementations utilize custom and/or dedicated data communications technologies instead of, or in addition to, the communications technologies described above.

The terms client and content provider as used herein may refer to software providing client and content-providing functionality, to hardware devices on which the software executes or to the entities operating the software and/or hardware. The term 'website' represents any computer system adapted to serve content using any internetworking protocols, and is not limited to content uploaded or downloaded via the Internet or HTTP.

The term computer-readable media includes computer-storage media. Example include magnetic-storage devices such as hard disks, floppy disks, and magnetic tape; optical disks such as compact disks (CD) and digital-versatile disks (DVD); magnetic-storage devices such as digital tapes, floppy disks, and magneto-resistive-random-access memory (MRAM); non-volatile memory such as read-only memory (ROM), erasable-programmable-read-only memory (EPROMs), and electrically-erasable-programmable-read-only memory (EEPROMs); volatile memory such as random-access memory (RAM), dynamic random access memory (DRAM), ferroelectric-random-access memory (FeRAM), and static-random-access memory (SRAM); or any type of media suitable for storing electronic instructions.

Furthermore, at times arrangements of operations have been referred to as modules or by functional names, without loss of generality. The term 'module' refers to computational logic for providing the specified functionality. The division of functionality between components, the naming of modules, sub-modules, components, attributes, data structures or any other programming or structural aspect is merely exemplary, and not mandatory or significant. In addition, other implementations may lack modules and/or distribute the described functionality among modules in a different manner. Functions performed by a component may instead be performed by multiple components, and functions performed by multiple components may instead performed by a single component. In general, functions described in one implementation as performing on the server side can be performed on the client side in other implementations and vice versa, if appropriate.

Although the subject matter has been described with a specific implementation, other alternatives, modifications, and variations will be apparent to those skilled in the art. Accordingly, the disclosure is intended to be illustrative, but not limiting, and all such alternatives, modifications, and variations are within the spirit and scope of the following claims.

What is claimed is:

1. A system comprising:
   a memory to store characteristics of prior user behavior with respect to active media interaction as a baseline user behavior of a user; and
   a processing device, coupled to the memory, to:
   compare current user behavior of the user with respect to interaction with a segment of media to the stored characteristics of the prior user behavior with respect to the active media interaction to determine whether a deviation of the current user behavior from the baseline user behavior indicates inactivity with respect to the segment of the media; and
   in response to determining that the deviation of the current user behavior from the baseline user behavior indicates inactivity with respect to the segment of the media:
   tag the segment of the media as a candidate for a low-bandwidth stream, perform an analysis of the current user behavior specific to the tagged segment of the media, and determine, based on the analysis of the current user behavior specific to the tagged segment of the media, whether to designate the tagged segment of the media for the low-bandwidth stream and to adjust playback functionality for the tagged segment of the media according to the low-bandwidth stream.

2. The system of claim 1 wherein the processing device is further to:
   designate the tagged segment of the media for the low-bandwidth stream.

3. The system of claim 2 wherein the user interaction analyzer is further configured to:
   when the current user behavior indicates activity with respect to the segment of the media, restore the playback functionality for the tagged segment of the media, wherein to restore the playback functionality, the processing device is to designate the tagged segment of the media for normal-bandwidth stream.

4. The system of claim 1 wherein the processing device is further to:
   monitor the prior user behavior with respect to the active media interaction; and
   identify the characteristics of the prior user behavior with respect to the active media interaction.

5. The system of claim 4 wherein the processing device is to monitor the prior user behavior with respect to the active media interaction by tracking at least one of status of keyboard, status of mouse, status of browser windows, status of phone jack, or screen use.

6. A method comprising:
   comparing, by a processing device, current user behavior of a user with respect to interaction with a segment of media with characteristics of prior user behavior representing a baseline user behavior of the user with respect to active media interaction to determine whether a deviation of the current user behavior from the baseline user behavior indicates inactivity with respect to the segment of the media; and
   in response to determining that the deviation of the current user behavior from the baseline user behavior indicates inactivity with respect to the segment of the media:
   tagging the segment of the media as a candidate for a low-bandwidth stream, performing an analysis of the current user behavior specific to the tagged segment of the media, and determining, based on the analysis of the current user behavior specific to the tagged segment of the media, whether to designate the tagged segment of the media for the low-bandwidth stream and to adjust playback functionality for the tagged segment of the media according to the low-bandwidth stream.

7. The method of claim 6 further comprising: designating the tagged segment of the media for the low-bandwidth stream.

8. The method of claim 7 further comprising:
   when the current user behavior indicates activity with respect to the segment of the media, restoring the playback functionality for the tagged segment of the media, wherein restoring the playback functionality comprises designating the tagged segment of the media for normal-bandwidth stream.

9. The method of claim 6 further comprising:
   monitoring the prior user behavior with respect to the active media interaction; and
   identifying the characteristics of the prior user behavior with respect to the active media interaction.

10. The method of claim 9 wherein monitoring the prior user behavior with respect to the active media interaction comprises tracking at least one of status of keyboard, status of mouse, status of browser windows, status of phone jack, or screen use.

11. The method of claim 6 wherein the media comprises at least one of video, music, podcasts, audio books, web sites, webpages, or multimedia presentations.

12. A non-transitory computer-readable storage medium including instructions that, when executed by a processing device, cause the processing device to perform operations comprising:
   comparing current user behavior of a user with respect to interaction with a segment of media with characteristics of prior user behavior representing a baseline user behavior of the user with respect to active media interaction to determine whether a deviation of the current user behavior from the baseline user behavior indicates inactivity with respect to the segment of the media; and
   in response to determining that the deviation of the current user behavior from the baseline user behavior indicates inactivity with respect to the segment of the media:
   tagging the segment of the media as a candidate for a low-bandwidth stream, performing an analysis of the current user behavior specific to the tagged segment of the media, and determining, based on the analysis of the current user behavior specific to the tagged segment of the media, whether to designate the tagged segment of the media for the low-bandwidth stream and to adjust playback functionality for the tagged segment of the media according to the low-bandwidth stream.

13. The non-transitory computer-readable storage medium of claim 12, the operations further comprising:
   designating the tagged segment of the media for the low-bandwidth stream.

14. The non-transitory computer-readable storage medium of claim 13, the operations further comprising:
   when the current user behavior indicates activity with respect to the segment of the media, restoring the playback functionality for the tagged segment of the media, wherein restoring the playback functionality comprises designating the tagged segment of the media for normal-bandwidth stream.

15. The non-transitory computer-readable storage medium of claim 12, the operations further comprising:
   monitoring the prior user behavior with respect to the active media interaction; and
   identifying the characteristics of the prior user behavior with respect to the active media interaction.

16. The non-transitory computer-readable storage medium of claim 15 wherein monitoring the prior user behavior with respect to the active media interaction comprises tracking at least one of status of keyboard, status of mouse, status of browser windows, status of phone jack, or screen use.

\* \* \* \* \*